No. 12,265. REISSUED AUG. 23, 1904.

G. TAGGART.

KNUCKLE PIN SUPPORT.

APPLICATION FILED JUNE 6, 1904.

Witnesses:

Chas. E. Taylor.

John Enders.

Inventor:

George Taggart,

By Dyrenforth, Dyrenforth & Lee,

Attys.

No. 12,265. Reissued August 23, 1904.

UNITED STATES PATENT OFFICE.

GEORGE TAGGART, OF OLATHE, KANSAS, ASSIGNOR OF ONE-HALF TO MICHAEL CLEARY, OF PAOLA, KANSAS.

KNUCKLE-PIN SUPPORT.

SPECIFICATION forming part of Reissued Letters Patent No. 12,265, dated August 23, 1904.

Original No. 714,258, dated November 25, 1902. Application for reissue filed June 6, 1904. Serial No. 211,434.

*To all whom it may concern:*

Be it known that I, GEORGE TAGGART, a citizen of the United States, residing at Olathe, in the county of Johnson and State of Kansas, have invented a new and useful Improvement in Knuckle-Pin Supports, of which the following is a specification.

My invention relates to that class of car-couplers of the "Janney" type equipped with means to support broken knuckle-pins, and thereby effect an equal distribution of strain on both parts of the pin and both arms of the coupler.

The object of my invention is to produce as a part or attachment to the coupler a stop-block having a shelf whereon the knuckle-pin may rest and an opening vertically below the pin through which a bar or rod may be passed to force the pin upward out of the coupler.

To this end the invention consists in certain novel and peculiar features of construction and combinations of parts, as hereinafter described and claimed, and in order that the invention may be fully understood reference is to be had to the accompanying drawings, in which—

Figure 2:
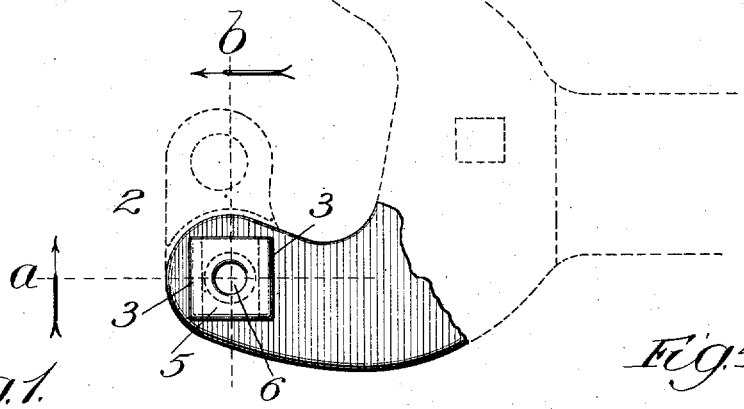
Figure 1:
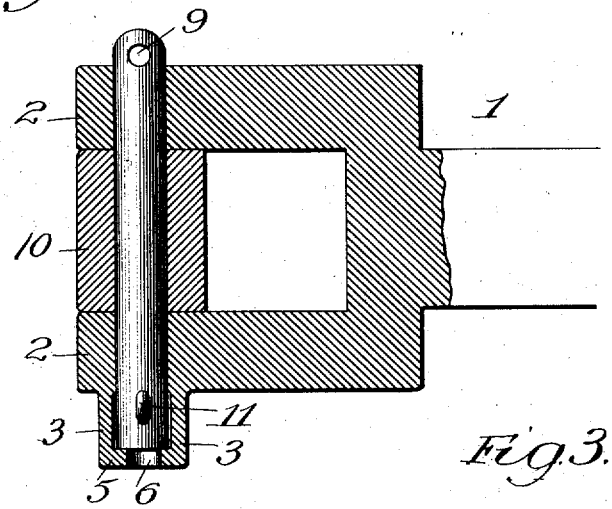
Figure 4:
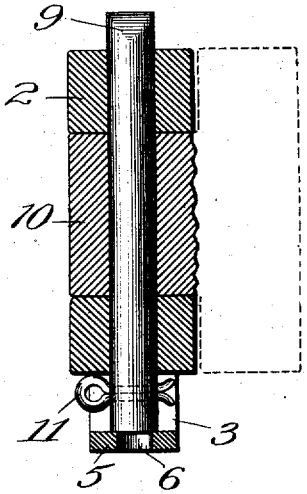
Figure 3:
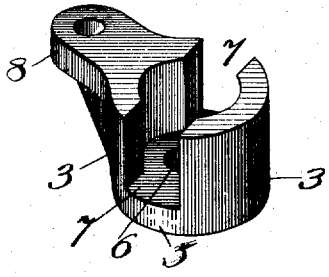

Figure 1 represents a vertical section taken, as indicated at line *a* of Fig. 2, through the knuckle-receiving arms of the coupler of the Janney type, the same being shown as equipped with means embodying my invention; Fig. 2, an inverted plan view of the same; Fig. 3, a detail perspective view, enlarged, of the pin-supporting device as preferably constructed when used as an attachment to an old coupler; and Fig. 4, a transverse vertical section, taken as indicated at the line *b* on Fig. 2.

Referring now to the drawings in detail, where like reference-numerals designate corresponding parts, 1 designates a coupler of any suitable or preferred type, and 2 the upper and lower knuckle-receiving arms thereof, said arms being perforated in the usual manner to receive the pin, hereinafter referred to. Depending from the lower arm at opposite sides (in front and rear) of its pin-perforation are walls 3, these being designed to be cast integral with new couplers. The walls are preferably imperforate and are connected by a shelf 5 at their lower ends, said shelf being centrally perforated, as at 6, with a hole smaller than the diameter of the pin referred to below.

In the modification shown in Fig. 3 the walls 3 are preferably segmental, the space 7 between them corresponding to the space between walls 3 of Fig. 1. In said figure also one of the segmental walls is formed with a perforated arm 8, adapted to be attached by a screw-bolt (not shown) to the lower knuckle-receiving arm 2 of an old coupler.

9 designates a headless knuckle-pin, the same extending down through arms 2 and the interposed knuckle 10 of the coupler, the pin resting at its lower end upon the shelf 5 between the walls 3 and directly over the hole 6. A spring-cotter 11 may be secured in the lower end of the pin, the space between the walls 3 being to enable the cotter to be secured in or removed from position. Obviously the usual headed pin may be employed and the pin be normally supported by its head, and in case of breakage the lower portion will drop slightly and rest upon the shelf, enabling the inspector to discover the breakage.

From the foregoing it will be seen that the breakage of the pin, which frequently occurs, will not be followed by the dislodgment of either part nor will such breakage impose all of the strain upon either of the walls 2. It will, however, be applied by the two sections of the pin upon both walls, and as a result the period of service of the coupler will not be shortened.

When the car arrives at a point where it is convenient to replace the broken pin by a new one, the trainman can remove the pin by first removing the cotter and forcing upwardly, introducing a rod through the hole 6 for this purpose.

It will thus be seen that I have produced what I prefer to call a "stop-block" for broken and headless knuckle-pins which embodies the feature of advantage enumerated as desirable and which as an attachment can be easily and quickly applied to old couplers and which when cast as an integral part of the couplers will increase the cost of the latter but little more than the market value of the extra iron used. It will also be apparent that said stop-block is of simple, strong, and durable construction and may be varied in minor particulars without departing from the spirit and scope of the appended claims.

It will be noted that in each construction a transverse passage is afforded above the shelf 5 and beneath the main portion of the coupler, the walls 3 lying in the front and rear of said passage. This transverse passage or channel permits insertion or removal of the cotter-pin from the side of the coupler, the channel being of sufficient size to admit the cotter-pin freely. The construction insures a strongly-supported shelf, the walls 3 being suitably located to prevent breakage under the severe conditions to which the couplers are subjected both before and after application to the cars.

Having thus described the invention, what I claim as new, and desire to secure by Letters Patent, is—

1. The combination with a coupler of the Janney type, and a headless knuckle-pin therein of the same size throughout its length; of a stop-block comprising two walls depending from the lower knuckle-arm at opposite sides of its pin-opening, and a shelf connecting the lower ends of these walls and passing completely below the pin, said shelf having a hole concentric with the pin's axis but smaller than the diameter of the pin, all as and for the purpose set forth.

2. The combination with a coupler of the Janney type, and a headless knuckle-pin therein of the same size throughout its length; of a stop-block comprising two segmental walls depending from the lower knuckle-arm at opposite sides of its pin-opening and spaced at their adjacent edges, a shelf connecting the lower ends of these walls and passing completely below the pin, said shelf having a hole concentric with the pin's axis but smaller than the diameter of the pin, and a cotter standing within said space above the shelf and passing through the pin, and all as and for the purpose set forth.

3. The combination with a coupler of the character set forth, and a knuckle-pin of uniform size throughout its lower half, of a pin-support carried directly by the head of the coupler and having a shelf lying wholly beneath the pin and provided with a passage above said shelf for freely receiving a cotter-pin, said shelf having a vertical perforation beneath and of less diameter than the pin, substantially as and for the purpose set forth.

4. The combination with a coupler of the character set forth, and a knuckle-pin of uniform size throughout its lower half and provided at its lower end with a cotter-pin-receiving perforation, of a pin-support beneath and cast integrally with the body of said coupler and having a shelf joined at its front and rear portions by vertical walls to the body of the coupler, said pin-support having a transverse passage and said shelf having a vertical perforation in alinement with and of less diameter than said knuckle-pin, and a cotter-pin lying freely in said transverse passage and extending through said knuckle-pin, substantially as and for the purpose set forth.

GEORGE TAGGART.

In presence of—
J. A. STEPHENSON,
MICHAEL CLEARY.